F. HAMACHEK.
DEVICE FOR EXPANDING AND CONTRACTING CHAINS.
APPLICATION FILED OCT. 3, 1910.
1,109,834. Patented Sept. 8, 1914.
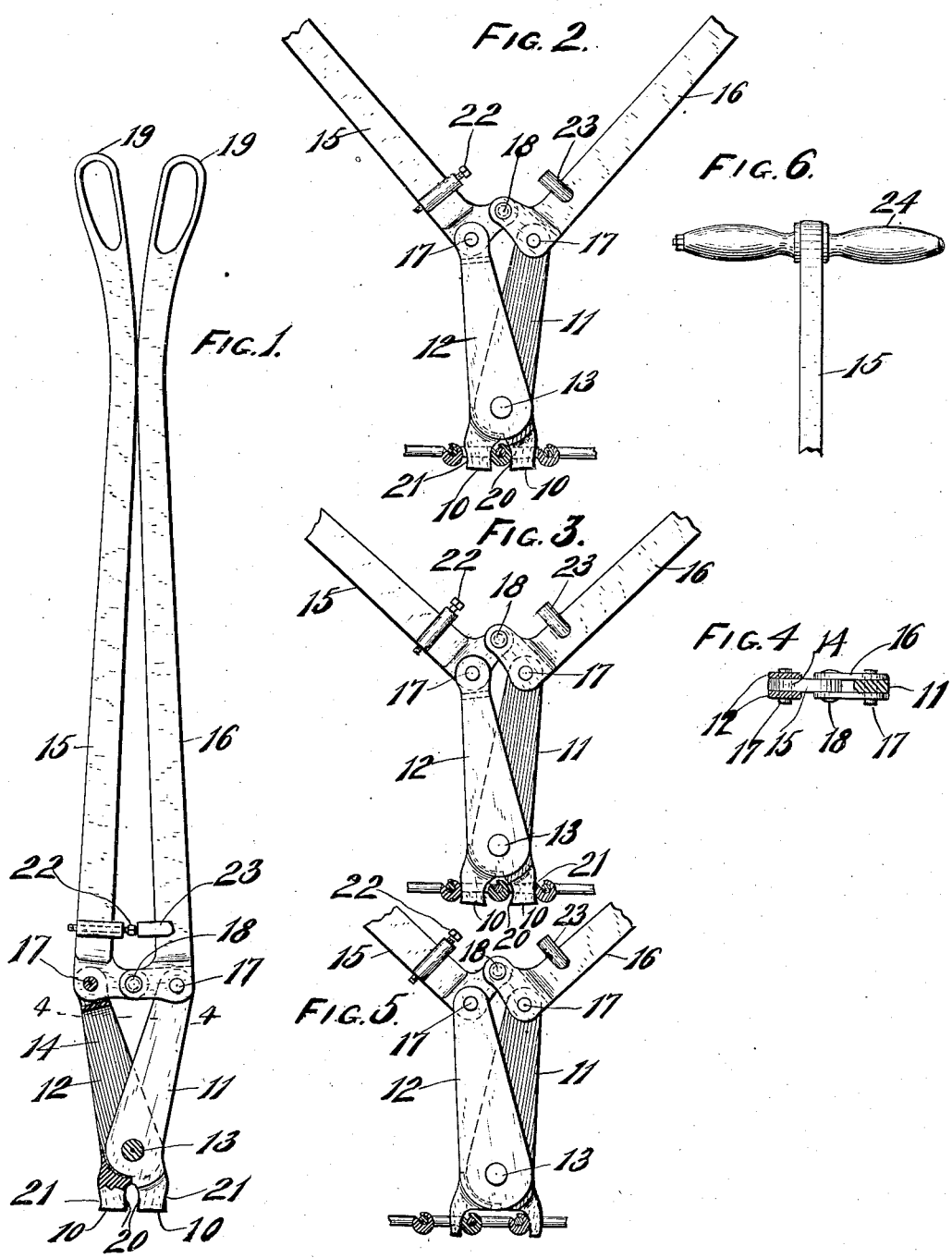

UNITED STATES PATENT OFFICE.

FRANK HAMACHEK, OF KEWAUNEE, WISCONSIN.

DEVICE FOR EXPANDING AND CONTRACTING CHAINS.

1,109,834.  Specification of Letters Patent.  Patented Sept. 8, 1914.

Application filed October 3, 1910. Serial No. 584,964.

*To all whom it may concern:*

Be it known that I, FRANK HAMACHEK, residing in Kewaunee, in the county of Kewaunee and State of Wisconsin, have invented new and useful Improvements in Devices for Expanding and Contracting Chains, of which the following is a description, reference being had to the acccompanying drawings, which are a part of this specification.

This invention relates to improvements in devices for expanding or contracting chains and is more particularly adapted for use in expanding or contracting sprocket chains.

In transmitting power by means of sprocket chains of the removable link type it is very difficult to form a plurality of chains, having an equal number of links, of exactly the same length due to the inequalities of the links. It has also been found that sprocket chains which have been in use a short time will "stretch" or wear sufficiently at the numerous joints to elongate the chain and the links will not fit the pitch line of the sprocket wheels and will have a tendency to climb up on the teeth thereof. The joints of the chains thus stretched will ofttimes ride up on the teeth of the sprocket wheels and be further stretched or perhaps broken. When a chain is in this condition a chain tightner is of little value as it cannot improve the fit with reference to the pitch line of the wheel and it also puts the chain under considerable strain which augments the wear of the joints and causes further stretching. A chain thus worn is of substantially the same strength and its life may be greatly prolonged by providing a means for closing the link joints to compensate for the wear thereof.

It is one of the objects of this invention to overcome the before mentioned objectionable features by providing a device which is adapted to expand or contract the links of the chain to the desired length so that variations in length of a number of chains may be corrected or the "stretch" of a chain may be taken up to any extent desired.

A further object of this invention is to provide a device which is adapted to expand or contract the links of a sprocket chain without removing the chain from the mechanish of which it forms a part.

A further object of the invention is to provide a device of sufficient power, and which is adapted to be operated manually, for compressing and equalizing the portions of links which have become weakened through unequal contraction after removal from the annealing oven.

A further object of the invention is to provide a device of the character described with adjustable means for limiting the movement of the operating mechanism to provide for contracting the links to a predetermined length.

A further object of the invention is to provide a device of the character described with means whereby the device may be operated by more than one operator.

With the above and other objects in view, the invention consists of the device and its parts and combinations as set forth in the claims, and all equivalents thereof.

In the accompany drawing in which the same reference characters indicate the same parts in all of the views: Figure 1 is a side view of the device, parts broken away and other parts in section to show interior construction; Fig. 2 is a side view of the lower portion of the device shown in open position and in engagement with the links of a chain, the chain being shown in section, to illustrate the manner of contracting the coupling hook to take up wear and slack in the chain; Fig. 3 is a similar view of the device showing the manner of expanding or stretching the links; Fig. 4 is a sectional detail view of the device taken on line 4—4 of Fig. 1; Fig. 5 is a side view of the lower portion of the device, slightly modified and showing the manner of compressing or shortening chain links; and Fig. 6 is a detail view of a modified form of handle whereby the device may be operated by more than one operator.

Referring to the drawing the numeral 10 indicates the jaws of a pair of lever arms 11 and 12 which are pivotally connected together near their lower ends by a pivot pin 13. The lever arm 12 above its jaw is formed of two thicknesses of metal forming an elongated slot 14 therebetween and into which a portion of the arm 11 extends in order to provide a double bearing for the pivot 13. Bell crank levers 15 and 16 connected to the upper ends of the lever arms 11 and 12 by pivot pins 17 have their short arms connected together by a pivot pin 18. The short arm of the bell crank lever 16 is formed of two thicknesses of metal spaced apart to accommodate therebetween the upper end of the lower arm 11 and the end of the short arm of the bell crank lever 15 to provide strong bearings for the pivot pins 17 and 18. The long arms of the bell crank levers extend upwardly and are formed with handle portions 19 for convenience in operating the device. The bell crank levers are so arranged and positioned that when in upright position the jaws are in open position and when the operating handles are swung away from each other the jaws are in open position. As both the inner and outer faces of the jaws are adapted to engage the chain links they are slightly curved, as indicated by the numerals 20 and 21, to better grasp the links and to prevent the links slipping out of the jaws while under strain. An adjustable stop screw 22 threaded through a lug formed on one of the bell crank levers is adapted to bear against a stop lug 23 formed on the other bell crank lever to limit the closing of the jaws.

In the modified form shown in Fig. 5 the jaws are spaced farther apart to extend over the ends of one link and a portion of another link.

The modified form of handle 24 shown in Fig. 6 provides for two or more operators grasping the handles when it is desired to exert more than the usual amount of power at the jaws.

The numeral 25 indicates portions of chain links to illustrate the manner of use of the device.

In use if it is desired to contract a chain which has become worn at the coupling joints the jaws of the device are inserted in the openings of the links and the coupling hook grasped between the jaws and contracted to closely surround the transverse portion of the adjacent link positioned therein. The operation is repeated with all of the coupling hooks or until the chain has been sufficiently shortened. If it is found necessary to extend or expand the chain the jaws of the device are inserted in the openings of the links and the operating handles are swung downwardly to separate the jaws and lengthen the links. The jaws of the device are so proportioned that the same device is adapted to be used for both expanding or contracting the links of chains of certain sizes. When it is desired to shorten the links to a considerable extent the modified device shown in Fig. 5 is used, as the jaws are spaced a sufficient distance apart to take in a complete link and the coupling hook of the adjacent link connected thereto. The handles are then swung toward each other to cause the jaws to compress the metal of the link and shorten it to the desired extent.

The adjustable stop screw provides for shortening or contracting all of the links to the extent desired. The double handle shown in Fig. 6 provides for exerting great pressure on the device to compress or expand links of larger size.

From the foregoing description it will be seen that a device is provided which is simple in construction and operation and is strong and durable and is adapted to compress the links of chains without removing said chains from the machines of which they form a part.

It is to be understood that this invention is not limited to any specific form or arrangement of parts except in so far as such limitations are specified in the claims.

What I claim as my invention is:

1. A device for expanding or contracting chains, comprising a lever arm provided with an elongated slotted portion, another lever arm having a portion extending into the slotted portion of the first mentioned arm, a pivot pin extending through the overlapping portions of both lever arms, said lever arms provided with jaw portions having chain link engaging faces, a bell crank lever having the apex of its angles extending into the slot of the slotted lever and pivotally connected to said slotted lever, said bell crank lever consisting of a long arm and a short arm, the last mentioned short arm being formed of two thicknesses of metal spaced apart and straddling the free end of the other short arm and the free end of the lever arm which extends into the slotted arm, a pivot pin extending through the overlapping portions of the short arms, a pivot pin extending through the overlapping portions of the two thicknesses of the bell crank lever and the lever arm extending therebetween, and an adjusting screw threaded to one of the bell crank levers and positioned to engage the other bell crank lever to limit the movement of the jaw portions.

2. A device for expanding or contracting detachable chain links and for closing the eyes thereof, comprising lever arms having medial overlapped portions pivoted together, each lever arm being provided with a jaw portion which extends in a plane on the same side of the pivotal connection as the arm, the faces of said jaws being shaped to partly surround the parts of the links engaged, and bell crank operating levers pivotally connected to the lever arms and having their inwardly extending portions pivotally connected together, the pivotal connections of the levers with each other and with the lever arms positioned to approximately aline with each other when the operating levers are in closed position.

3. A device for expanding or contracting detachable chain links and for closing the eyes thereof, comprising lever arms having medial overlapped portions pivoted together, each lever arm being provided with a jaw portion which extends in a plane on the same side of the pivotal connection as the arm, the inner and outer faces of said jaws being of curved shape to partly surround the parts of the links engaged, and bell crank operating levers connected to the lever arms and having their inwardly extending portions pivotally connected together, the pivotal connections of the levers with each other and with the lever arms positioned to approximately aline with each other when the operating levers are in closed position.

In testimony whereof, I affix my signature, in presence of two witnesses.

FRANK HAMACHEK.

Witnesses:
V. H. JANDA,
JOHN WALECHA, Jr.